June 17, 1924.

F. P. HUMMEL

WHEEL RIM

Filed April 10, 1922   2 Sheets-Sheet 1

1,497,725

F. P. Hummel,
Inventor

By C. A. Snow & Co.
Attorney

June 17, 1924.

F. P. HUMMEL

WHEEL RIM

Filed April 10, 1922

F. P. Hummel,
Inventor

By C. A. Snow & Co.
Attorney

Patented June 17, 1924.

1,497,725

UNITED STATES PATENT OFFICE.

FRANKLIN PIERCE HUMMEL, OF CLYDE, OHIO.

WHEEL RIM.

Application filed April 10, 1922. Serial No. 551,282.

*To all whom it may concern:*

Be it known that I, FRANKLIN PIERCE HUMMEL, a citizen of the United States, residing at Clyde, in the county of Sandusky and State of Ohio, have invented a new and useful Wheel Rim, of which the following is a specification.

This invention relates to automobile rims for vehicle wheels to facilitate the positioning and removal of a pneumatic tire.

The object of the invention is to provide a rim of this character including tire and felly carried members equipped with simple and efficient cooperating means for locking the members securely engaged with each other in tire holding position, and which are readily releasable to permit the removal of the tire.

Another object is to provide a sectional rim of this character in which the sections are arranged one within the other and having interlocking engagement with each other whereby relative longitudinal sliding movement is prevented.

Another object is to provide a rim of this character equipped with an expansible and contractable removable locking section equipped with means for simultaneously expanding said locking section and securing it to another section of the rim.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

In the embodiment illustrated the rim constituting this invention comprises an inner or felly engaging section 5 and an outer or tire carrying section 10 which are arranged one within the other and interlockingly engaged by means presently to be described, and held engaged by a locking section 20.

Figures 5, 6:
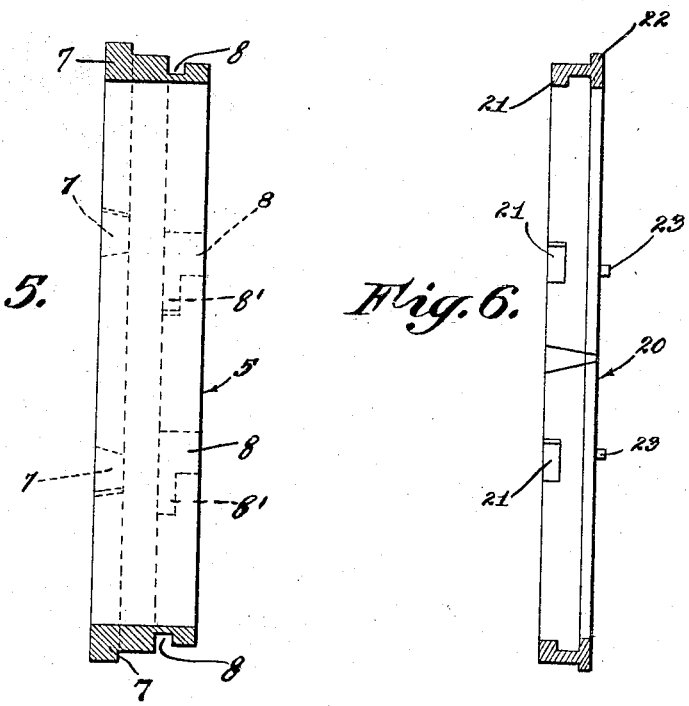
Figure 5 is a transverse section through the inner or felly engaging rim section.
Figure 6 is a similar view through the locking section of the rim.

The inner section 5, as shown in Figure 5, is equipped on its inner face with a boss 6 adapted to fit in a seat 3 formed in the periphery of the wheel felly 1 and which in connection with bolts 4 operates to hold said section fixed to the felly.

This section 5 is provided on its outer face near one edge with a plurality of peripherally spaced lugs 7 which are here shown tapering inwardly at their side edges for a purpose presently to be described. A seat $6^a$ extends transversely across the outer face of section 5 in boss 6 thereof (see Fig. 4). This section is also provided in its outer face at its opposite side edge with a plurality of peripherally spaced recesses 8 here shown L-shaped in form with one branch thereof opening through the side edge of the section and the other branch 8′ extending circumferentially thereof. These L-shaped recesses are designed to be interlockingly engaged by cooperating lugs 21 on the locking ring section 20 to be described.

The outer or tire carrying rim section 10 is composed of two detachably connected members 11 and 12, to provide for the application and removal of a tire so that a tube may be inserted or removed when necessary each having at its outer edge a tire engaging flange 13. The meeting faces of the members 11 and 12 are provided with interlocking lugs and grooves. The member 12 has lugs 14 adjacent its inner edge with a groove 15 behind them, while member 11 has a rib $14^a$ adjacent its inner edge with a groove $15^a$ behind it to receive the lugs 14 of member 12, the rib $14^a$ of member 11 having recesses for the entry of lugs 14. It will thus be seen that when said members are assembled they will be held securely against transverse movement relatively to each other.

The inner face of the member 11 of the rim section 10 is equipped at the edge opposite its grooved edge with a plurality of recesses 16 positioned to register with the lugs 7 on the rim section 5 and which correspond in shape to said lugs to form a wedge-like engagement between the sections when applied.

Figure 1:
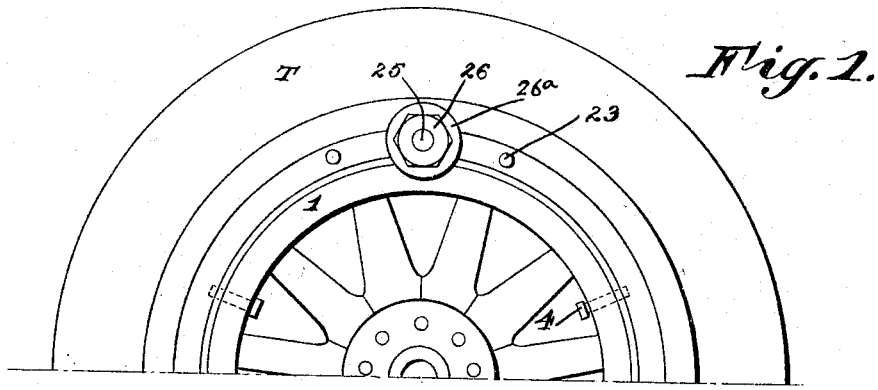
Figure 1 represents a side elevation of a portion of a vehicle wheel with this improved rim shown applied.
Figure 2:
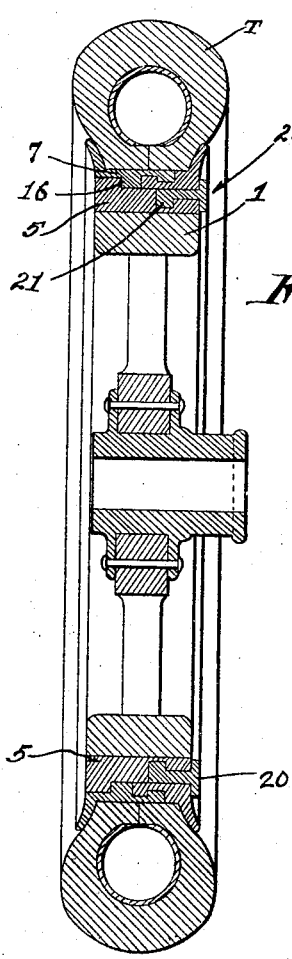
Figure 2 is a transverse section through the wheel.
Figure 3:
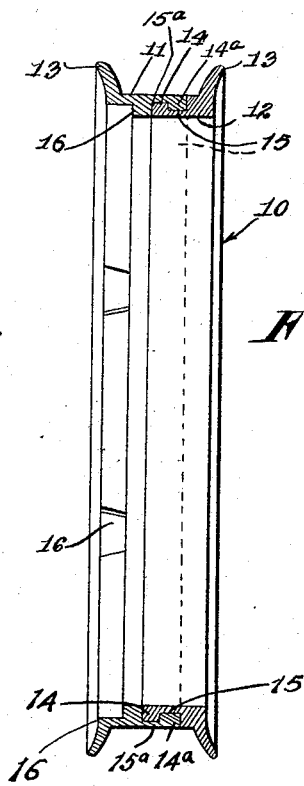
Figure 3 is a similar view through the outer section of the rim constituting this invention showing the inner face thereof in elevation.

The split annular locking ring section 20 is shown in detail in Figure 6 and applied in Figures 1 and 2, and is designed to interlockingly engage with the inner rim section 5 by means of peripherally spaced lugs 21 formed on its inner face near its inner edge which are designed to enter the L-shaped recesses 8 of section 5 and to be turned into the circumferentially extending portions of said recesses to hold the sections in operative position. Section 20 is provided at its outer edge with a radially extending flange 22 which when said section is applied is designed to overlap the outer faces of sections 5 and 10 as is shown clearly in Figure 2. This section 20 is also provided on its outer face with a pair of laterally projecting studs 23, located on opposite sides of the split in said section and which are designed to be engaged by a suitable tool for expanding and contracting said section and for turning it to engage it with section 5 or to disengage it therefrom.

Figure 7:
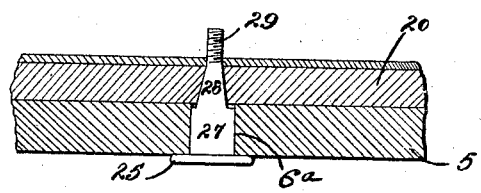
Figure 7 is a detail horizontal section showing the means for locking the sections in operative position.

A combined spreading and locking bolt is shown at 25 in Figure 7 and is designed to pass through the seat 6ª of felly section 5 between it and section 10 and between the split ends of the locking section 20 and is held engaged with said section by a suitable nut 26, a washer 26ª being located on the bolt between the nut and the outer face of the split ends of section 20. This bolt 25 has an angular body portion 27 which extends through the correspondingly shaped seat 6ª in the felly section 6 which prevents turning of the bolt when applied. The outer portion 28 of the bolt which extends between the split ends of the locking section 20 is made tapered in form so as to exert a wedging action on these ends to expand the section and hold it securely in operative position. The terminal of the bolt is threaded as shown at 29 and extends beyond the outer face of the locking rim section 20 to receive the securing nut 26.

Figure 4:
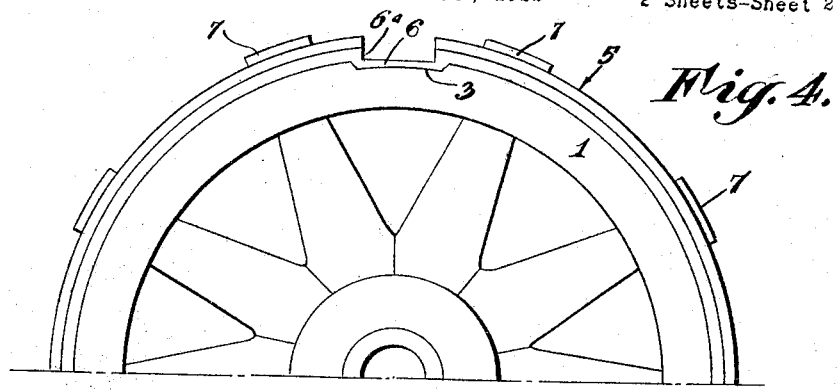
Figure 4 is a side elevation of a portion of a vehicle wheel with the felly carried rim section constituting a part of this invention shown in side elevation thereon.

In the use of this rim, the inner or felly engaging section 5 is fixedly mounted on the felly 1 as shown in Figure 4 and secured thereto by interlocking engagement of the boss 6 with the recess 3 and by means of the bolts 4 which extend through the felly into said section 5 as is shown clearly in Figure 1. This rim section is designed to be permanently carried by the wheel while the outer section 10 is carried by the tire T and the two sections are united by slipping the section 10 transversely on to section 5 with the lugs 7 entering the recesses 16 and then inserting the locking section 20 between the sections 5 and 10 by passing the lugs 21 through the recesses 8 and turning the section 20 to cause said lugs to enter and interlockingly engage with the circumferentially disposed portions of said recesses. When this member 20 is so positioned, the flange 22 thereof will overlap the outer faces of the sections 5 and 10 and it is securely engaged therewith by means of the combined locking and wedging bolt 25 in the manner above described.

To remove the tire T in case of a puncture or for any other purpose, the bolt 25 is first removed and then the locking section 20 is grasped by the studs 23 and said section turned to release the lugs 21 from the recesses 8 of section 5 which will permit said section to be slipped laterally outward and then the section 10 carrying the tire T may be readily separated from section 5. The spare tire is designed to be equipped with one of the sections 10 so that no delay will be occasioned when changing a tire.

I claim:—

1. The combination with a wheel felly; of a rim fixed thereto and provided on its outer face near one edge with a plurality of peripherally spaced lugs and having a keyway extending transversely across its outer face, said section having peripherally spaced L-shaped recesses in its outer face near its other edge with one branch of each recess opening through said rim edge, a tire carrying section having transversely extending recesses in its inner face near one edge to receive the lugs on said felly section, and a split annular locking ring insertable between said sections and having lugs on its inner face to enter the recesses in said felly section whereby the felly, tire carrying and locking sections are locked against relative turning, the split in said locking ring being located to register with the transverse seat in said rim section when the parts are assembled, and a combined spreading and locking bolt extending through said seat and between said ring ends.

2. The combination with a wheel felly; of a rim fixed thereto and provided on its outer face near one edge with a plurality of peripherally spaced lugs and having a keyway extending transversely across its outer face, said section having peripherally spaced L-shaped recesses in its outer face near its other edge with one branch of each recess opening through said rim edge, a tire carrying section having transversely extending recesses in its inner face near one edge to receive the lugs on said felly section, and a split annular locking ring insertable between said sections and having lugs on its inner face to enter the recesses in said felly section whereby the felly, tire carrying and locking sections are locked against relative turning, the split in said locking ring being located to register with the transverse seat in said rim section when the parts are assembled, and a combined spreading and locking bolt extending through said seat and between said ring ends, a portion of the bolt and the split rim ends being tapered to exert a wedging action to expand the ring.

3. The combination with a wheel felly; of a felly carried rim section, a tire carrying section and a split annular locking section, said felly and tire carrying sections having interlocking lugs and recesses to hold them against relative turning and said felly section and locking section having interlocking lugs and recesses, the split ends of said locking ring being bevelled from their outer toward the inner edge of said ring, and a bolt extending through said felly section and having a tapered portion to enter between said bevelled ends to expand the locking section, said locking section having flanges at its outer edge lapping the felly and tire carrying sections.

4. In a rim of the class described, felly and tire carried sections detachably connected and a locking ring insertable between said sections, said ring and one of said sections having interengaging lugs and recesses, said ring being split and the ends thereof bevelled, the outer edge of said ring having laterally extending flanges for lapping the outer faces of said sections, a wedge bolt extending through one of said sections and between the split ends of said ring for expanding the ring, and lugs mounted on the outer face of said ring adjacent its split ends.

In testimony that I claim the foregoing as my own, I have hereto affixed my signature in the presence of two witnesses.

FRANKLIN PIERCE HUMMEL.

Witnesses:
EMMIT G. HILL,
WILLIAM N. MORGAN.